US012169995B2

(12) United States Patent
Pechinko

(10) Patent No.: US 12,169,995 B2
(45) Date of Patent: Dec. 17, 2024

(54) EVALUATING CURRENCY IN AREAS USING IMAGE PROCESSING

(71) Applicant: JCM American Corporation, Las Vegas, NV (US)

(72) Inventor: Paul Pechinko, Harpersfield Township, OH (US)

(73) Assignee: JCM American Corporation, Las Vegas, NV (US)

( * ) Notice: Subject to any disclaimer, the term of this patent is extended or adjusted under 35 U.S.C. 154(b) by 0 days.

(21) Appl. No.: 17/036,589

(22) Filed: Sep. 29, 2020

(65) Prior Publication Data
US 2021/0027564 A1 Jan. 28, 2021

Related U.S. Application Data

(62) Division of application No. 16/810,455, filed on Mar. 5, 2020, now abandoned.
(Continued)

(51) Int. Cl.
*G06K 9/00* (2022.01)
*G06V 10/98* (2022.01)
(Continued)

(52) U.S. Cl.
CPC ........... *G07D 7/003* (2017.05); *G06V 10/993* (2022.01); *G06V 20/52* (2022.01); *G07D 7/1205* (2017.05);
(Continued)

(58) Field of Classification Search
CPC ...... G07D 7/1205; G07D 7/003; G07D 11/50; G07D 2207/00; G07D 7/2016; G07D 7/12;
(Continued)

(56) References Cited

U.S. PATENT DOCUMENTS 7,017,812 B1* 3/2006 Schramm, Jr. ..... G06K 7/10574
235/454
2001/0006556 A1* 7/2001 Graves ................ G06V 10/143
382/135
(Continued)

FOREIGN PATENT DOCUMENTS

CN 101981597 A 2/2011
CN 205788441 U 12/2016
(Continued)

OTHER PUBLICATIONS

International Search Report and Written Opinion dated Jul. 7, 2020 for PCT/US20/29331 (13 pages).

*Primary Examiner* — Atiba O Fitzpatrick
(74) *Attorney, Agent, or Firm* — FisherBroyles, LLP; Rob L. Phillips

(57) ABSTRACT

A system evaluates currency in an area using image processing. In some examples, the system receives an image of an area from an image sensor, processes the image to identify at least one item of currency in the area, determine a value of the currency irrespective of validity, and counts the currency. In various examples, the system receives an image of an area from an image sensor; processes the image to identify at least one item of currency in the area; determines whether the currency has an error condition; and when the currency is determined to have the error condition, provides output on the error condition. In a number of examples, the system receives an image of an area from an image sensor; processes the image to identify at least one item of currency in the area; determines whether the currency is valid; and when the currency is determined to be suspect, provides output on the currency.

13 Claims, 7 Drawing Sheets

Related U.S. Application Data

(60) Provisional application No. 62/838,046, filed on Apr. 24, 2019.

(51) Int. Cl.
  *G06V 20/52* (2022.01)
  *G07D 7/00* (2016.01)
  *G07D 7/1205* (2016.01)
  *G07D 11/50* (2019.01)

(52) U.S. Cl.
  CPC ......... *G07D 11/50* (2019.01); *G07D 2207/00* (2013.01)

(58) Field of Classification Search
  CPC .......... G07D 7/206; G07D 7/202; G07D 5/00; G07D 5/04; G07D 5/08; G06K 9/2018; G06K 9/2063; G06K 2209/01; G06K 19/025; G06K 9/00469; G06T 2207/30176; G06T 2207/30242; G06T 2207/30232; G06T 2207/30196; G06T 7/70; G06T 7/73; G06T 7/74; G06T 7/75; G06T 7/77; G07F 17/3241; G07F 17/322; G07F 17/3244; G07F 17/3246; G07F 17/3248; G07F 17/3232; G07F 17/3234; A63F 3/00157; A63F 2250/13; A63F 2250/133; A63F 2250/136; A63F 2250/58; A63F 2009/2435; G06V 20/95; G06V 20/52; G06V 40/28; G06V 40/20; G06V 10/98; G06V 10/987; G06V 10/993; H04N 7/18; G06F 3/017
  See application file for complete search history.

(56) References Cited

U.S. PATENT DOCUMENTS

| | | | |
|---|---|---|---|
| 2002/0068625 A1* | 6/2002 | Soltys | G07F 17/3202 463/29 |
| 2002/0072406 A1 | 6/2002 | Soltys et al. | |
| 2003/0081824 A1* | 5/2003 | Mennie | G07D 7/06 382/135 |
| 2003/0118228 A1* | 6/2003 | Mennie | G07F 19/20 382/135 |
| 2003/0202690 A1* | 10/2003 | Jones | G06Q 40/02 382/139 |
| 2004/0145726 A1* | 7/2004 | Csulits | G07D 7/12 356/71 |
| 2004/0222283 A1* | 11/2004 | Mastie | G06Q 20/1085 235/379 |
| 2011/0019901 A1 | 1/2011 | Matsuura et al. | |
| 2012/0013891 A1* | 1/2012 | Jones | G07D 11/30 356/71 |
| 2012/0189186 A1* | 7/2012 | Csulits | G07D 11/50 382/135 |
| 2012/0217416 A1* | 8/2012 | Decoux | G01N 21/64 250/461.1 |
| 2017/0193727 A1* | 7/2017 | Van Horn | G07D 7/0043 |

FOREIGN PATENT DOCUMENTS

| | | |
|---|---|---|
| EP | 3188138 A1 | 7/2017 |
| EP | 3287982 A1 | 2/2018 |
| WO | 2002010045 A1 | 2/2002 |
| WO | 2014130642 A2 | 8/2014 |

\* cited by examiner

EVALUATING CURRENCY IN AREAS USING IMAGE PROCESSING

CROSS-REFERENCE TO RELATED APPLICATION

This application is a division of U.S. patent application Ser. No. 16/810,455, filed Mar. 5, 2020, which is a nonprovisional of and claims the benefit under 35 U.S.C. § 119(e) of U.S. Provisional Patent Application No. 62/838,046, filed Apr. 24, 2019, the contents of which are incorporated herein by reference as if fully disclosed herein.

FIELD

The described embodiments relate generally to image processing. More particularly, the present embodiments relate to evaluating currency in areas using image processing.

BACKGROUND

Currency may include any kind of item used as a medium of monetary exchange. Items of currency may include one or more banknotes or other bills, coins, chips, and so on. Items of currency may be one of a number of different denominations and accordingly have one or more different corresponding values. Currency may be issued and/or otherwise implemented, honored, backed, and so on by one or more governments (such as the United States dollar, the Euro, and so on), private organizations (such as casino chips, concession tickets, and so on), and so on.

Various entities may monitor and/or evaluate currency in a variety of different situations. For example, parties to a currency exchange may count currency (such as counting a number of items of currency, values corresponding to denominations of the items of currency, and so on), determine whether items of currency are valid or counterfeit, and so on, perform actions based on currency monitoring and/or evaluation (such as approving a transaction if a cumulative determined value associated with a number of items of currency equals or exceeds a transaction price, crediting and/or debiting a value associated with the currency to a financial account, and so on).

SUMMARY

The present disclosure relates to evaluating currency in areas using image processing. A system evaluates currency in an area using image processing. In some examples, the system receives an image of an area from an image sensor, processes the image to identify at least one item of currency in the area, determine a value of the currency irrespective of validity, and counts the currency. In various examples, the system receives an image of an area from an image sensor; processes the image to identify at least one item of currency in the area; determines whether the currency has an error condition; and when the currency is determined to have the error condition, provides output on the error condition. In a number of examples, the system receives an image of an area from an image sensor; processes the image to identify at least one item of currency in the area; determines whether the currency is valid; and when the currency is determined to be suspect, provides output on the currency.

In various embodiments, a system for evaluating currency in areas using image processing includes a non-transitory storage medium that stores instructions and a processor. The processor executes the instructions to receive an image of an area from an image sensor, process the image to identify at least one item of currency in the area, determine a value of the at least one item of currency irrespective of validity, and count the at least one item of currency.

In some examples, the processor processes the image by detecting a security feature of the at least one item of currency. In various implementations of such examples, the security feature is an infrared strip.

In a number of examples, the processor processes the image by screening out at least one element common to the image and a previous image. In various examples, the processor counts the at least one item of currency by determining a denomination of the at least one item of currency.

In some examples, the processor transmits the count to an electronic device. In a number of implementations of such examples, the processor performs an action using a response received from the electronic device.

In some embodiments, a system for evaluating currency in areas using image processing includes a non-transitory storage medium that stores instructions and a processor. The processor executes the instructions to receive an image of an area from an image sensor; process the image to identify at least one item of currency in the area; determine whether the at least one item of currency has an error condition; and when the at least one item of currency is determined to have the error condition, provide output on the error condition.

In various examples, the error condition is that the at least one item of currency is obscured in the image by an obstruction. In a number of implementations of such examples, the output includes a direction to remove the obstruction.

In some examples, the error condition is that the at least one item of currency is incorrectly oriented for identification. In various implementations of such examples, the output includes a direction to reorient the at least one item of currency.

In a number of examples, the image is at least one of a still image or a video. In various examples, the image sensor is located at least approximately over one meter from the at least one item of currency.

In a number of embodiments, a system for evaluating currency in areas using image processing includes a non-transitory storage medium that stores instructions and a processor. The processor executes the instructions to receive an image of an area from an image sensor; process the image to identify at least one item of currency in the area; determine whether the at least one item of currency is valid; and when the at least one item of currency is determined to be suspect, provide output on the at least one item of currency.

In various examples, the processor determines that the at least one item of currency is suspect when the processor identifies the at least one item of currency as counterfeit. In some implementations of such examples, the processor identifies the at least one item of currency as counterfeit when the processor is unable to locate a security feature of the at least one item of currency during processing of the image. In a number of implementations of such examples, the processor identifies the at least one item of currency as counterfeit using a numerical identifier extracted from the image using optical character recognition.

In some examples, the image includes a first image from a camera and a second image from an infrared image sensor. In a number of examples, the image sensor includes an infrared filter.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
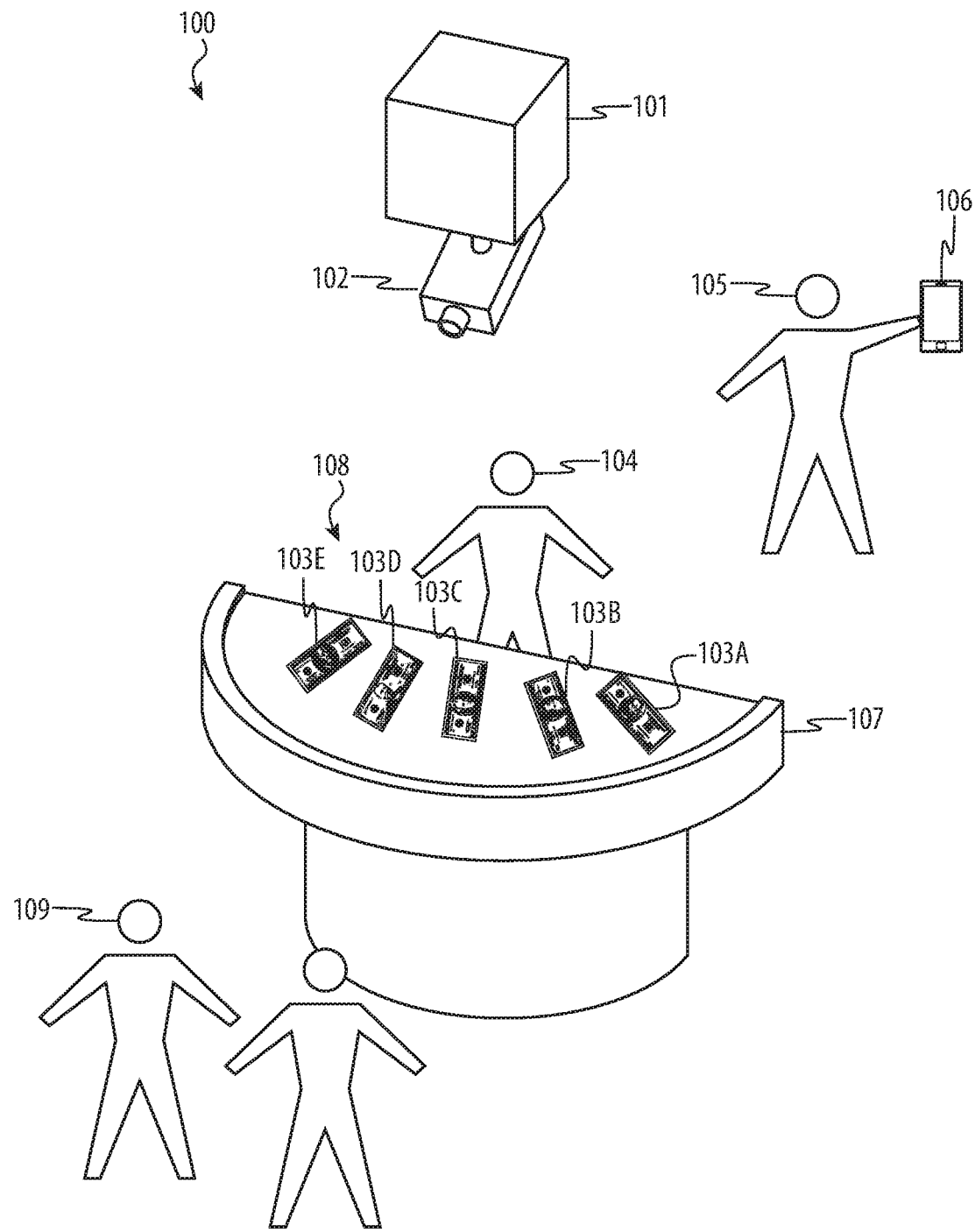
FIG. 1 depicts an example system for evaluating currency in areas using image processing.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

As discussed above, various entities may monitor and/or evaluate currency in a variety of different situations. For example, an automated teller machine may have a bill feeder that is operable to pull in, count, and validate a stack of bills. However, in many situations, such a bill feeder may not be practical.

For example, a casino may have a number of different table games where various items of currency may be used. A dealer or other person at the table may be able to accept the various items of currency as part of people changing the various items of currency for other items of currency (such as banknotes or other bills for chips, changing banknotes or bills for other banknotes or bills of other denominations, changing chips for chips of other denominations, and so on), people placing wagers and/or otherwise participating in a game or other activity at the table, and so on. The various items of currency may eventually be fed into a bill feeder or similar mechanism that counts and/or validates the various items of currency, perhaps after the various items of currency are combined with other items of currency accepted at other tables or similar locations.

However, waiting until the various items of currency are taken to a bill feeder or similar mechanism may not be responsive to table-level conditions. Counts may not be real time and may not be available at a table level. Further detection of counterfeits upon taking the various items of currency to a bill feeder or similar mechanism may greatly slow the ability to deal with possible counterfeits, as well as impair the ability to know which table accepted the counterfeits.

The present disclosure may use image processing to evaluate currency in an area. A system may use one or more cameras and/or other image sensors (such as one or more still image cameras, video cameras, cameras with infrared filters, infrared image sensors, ultraviolet image sensors, and so on) located at various distances (such as within approximately a meter, between approximately 1 meter and 3 meters, over approximately 3 meters, and so on) to obtain one or more images of an area (such as continuously, periodically, occasionally, upon user input and/or other triggering events) and process the image to identify one or more items of currency. Various actions may then be performed using the identified items of currency. For example, currency may be counted, guidance regarding enabling currency to be better identified may be provided, counterfeits and/or other suspicious currency may be detected and/or dealt with, and so on.

In this way, such a system may be able to perform currency monitoring, tracking, and/or evaluating and/or other functions that would not otherwise be possible. This may improve the functioning of the system and/or improve the efficiency of hardware, software, personnel, and/or other components of the system; reduce the number of components (such as bill feeders) used to implement the system; and so on. Various configurations are possible and contemplated without departing from the scope of the present disclosure.

The following disclosure relates to evaluating currency in areas using image processing. A system evaluates currency in an area using image processing. In some examples, the system receives an image of an area from an image sensor, processes the image to identify at least one item of currency in the area, determine a value of the currency irrespective of validity, and counts the currency. In various examples, the system receives an image of an area from an image sensor; processes the image to identify at least one item of currency in the area; determines whether the currency has an error condition; and when the currency is determined to have the error condition, provides output on the error condition. In a number of examples, the system receives an image of an area from an image sensor; processes the image to identify at least one item of currency in the area; determines whether the currency is valid; and when the currency is determined to be suspect, provides output on the currency.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 depicts an example system 100 for evaluating currency in an area 108 using image processing. The system 100 may include one or more electronic devices 101 and/or one or more image sensors 102. The electronic device 101 may be operative to receive one or more images of the area 108 from the image sensor 102. In some implementations, the image sensor 102 may be positioned at a distance from the area 108 (such as within approximately 1 meter, over 1 meter, between approximately 1 meter and 4 meters, over approximately 3 meters, and so on). The electronic device

101 may process the image to identify one or more items of currency 103A-103E in the area 108.

The electronic device 101 may also perform a variety of actions related to the items of currency 103A-103E. For example, the electronic device 101 may count the items of currency 103A-103E, determine whether or not the items of currency 103A-103E are valid or are suspect for some reason (such as possibly being counterfeit), provide output regarding whether or not the items of currency 103A-103E are valid or might be counterfeit and/or otherwise suspect, determine whether or not the items of currency 103A-103E have an error condition (i.e., an issue) (such as one or more of the items of currency 103A-103E are obscured by an obstruction in the image, are incorrectly oriented for identification, are blocked by each other, are flipped over on a side that needs to be imaged for identification, and so on), provide output regarding an error condition with the items of currency 103A-103E (such as a direction to remove an obstruction that is preventing identification, a direction to reorient one of the items of currency 103A-103E, a direction to move the items of currency 103A-103E to prevent them from blocking each other, a direction to flip over one of the items of currency 103A-103E, and so on). Various configurations are possible and contemplated without departing from the scope of the present disclosure.

By way of illustration, the system 100 may involve a table 107 used for a table game (such as poker, roulette, craps, and so on) at a casino. A dealer 104 at the table 107 may obtain the items of currency 103A-103E from one or more players 109 in exchange for one or more casino chips and/or otherwise as a wager and/or other participation in a game at the table 107. In such a situation, the dealer 104 may fan and/or otherwise spread out and/or position the items of currency 103A-103E in the area 108 on the table 107 and provide a signal (such as by positioning the items of currency 103A-103E in the area 108 and/or otherwise making a gesture recognized by the electronic device 101 as requesting a count when the electronic device 101 processes one or more images of the area 108, by providing input via an associated electronic device such as a button on the table 107 and/or on an electronic device controlled by the dealer 104, and so on). The electronic device 101 may use one or more images of the area 108 obtained from the image sensor 102 (which may also function to obtain casino security footage) to identify and count the items of currency 103A-103E. The electronic device 101 may then signal a mobile electronic device 106 associated with a pit boss 105 regarding the count and the pit boss 105 may use the mobile electronic device 106 to accept the count. The dealer 104 may then be authorized to accept the items of currency 103A-103E (such as by placing the items of currency 103A-103E into a receptacle in the table 107 through a slot in the surface, by providing the items of currency 103A-103E to a central storage area in the casino, and so on). The electronic device 101 may maintain a running count of the total value of currency stored at the table 107 and/or at other tables (such as for determining when to collect currency from the table, evaluating and/or analyzing or monitoring activity at tables, tracking chip counts and/or denomination at tables in order to know when to restock chips at tables, evaluating and/or otherwise monitoring player activity and/or performance, and so on). In some examples, the electronic device 101 may provide output to the dealer 104 regarding the authorization, such as by transmitting a message to an electronic display at the table 107, using a projector or other light source or emitter to project an indicator onto the items of currency 103A-103E and/or otherwise in the area 108 and/or the table 107, transmitting a message to an electronic device associated with the dealer 104 (such as a wearable device, a smart phone, and so on), and so on. Various configurations are possible and contemplated without departing from the scope of the present disclosure.

However, it is understood that this is an example. The techniques in the present disclosure may be used in a variety of contexts other than a casino (such as any area where a large amount of currency may be present such as a bank, an automated teller machine, and so on) and/or at a table game in a casino (such as a teller's cage, a counting room, a currency storage area, and so on) without departing from the scope of the present disclosure.

The image sensor 102 may be one or more of a variety of different image sensors. For example, the image sensor 102 may be one or more still image cameras, video cameras, security cameras, infrared sensors, ultraviolet sensors, cameras or other image sensors with one or more infrared filters, cameras or other image sensors with one or more ultraviolet filters, a combination of a standard camera and an infrared camera or night vision camera, and so on. Various configurations are possible and contemplated without departing from the scope of the present disclosure.

The electronic device 101 may process one or more different images in a variety of different ways to identify and/or otherwise evaluate the items of currency 103A-103E. For example, the electronic device 101 may distinguish the items of currency 103A-103E using one or more colors of the items of currency 103A-103E, comparisons between one or more colors of the items of currency 103A-103E and one or more colors of the area 108, comparisons between one or more patterns or other features of the items of currency 103A-103E and one or more patterns or other features of the area 108, the shape of the items of currency 103A-103E, detection of one or more security features of the items of currency 103A-103E (such as one or more watermarks that are revealed under ultraviolet, infrared, and/or other illumination; one or more security strips that glow particular colors under ultraviolet, infrared, and/or other illumination; one or more banded areas or strips of the items of currency 103A-103E that appear under ultraviolet, infrared, and/or other illumination; and so on), detection of movement in the area 108 in video (such as movement corresponding to the items of currency 103A-103E entering the area 108, positioning of the items of currency 103A-103E in the area 108, and so on), comparison of differences between one or more previous images of the area 108 when the items of currency 103A-103E were not present with one or more current images of the area 108 that include the items of currency 103A-103E (e.g., where the previous image or images are used to calibrate image recognition to filter out the area 108 and focus in on differences such as the items of currency 103A-103E), optical character recognition of text on the items of currency 103A-103E (such as one or more serial numbers, denomination numbers, and so on), and so on. In still another example, the electronic device 101 may use one or more neural networks and/or other artificial intelligence structures that are operable to process images to perform various recognitions and update themselves using data learned from previous image processing. Various configurations are possible and contemplated without departing from the scope of the present disclosure.

As part of processing one or more different images to identify and/or otherwise evaluate the items of currency 103A-103E, the electronic device 101 may determine a denomination associated with one or more of the items of currency 103A-103E. For example, the electronic device

101 may perform optical character recognition to determine a denomination number (such as the number 1, 5, 10, 20, 50, 100, and so on that may be present on a United States banknote). Alternatively, the electronic device 101 may detect a particular security feature (such one or more security strips that glow particular colors associated with particular denominations under ultraviolet, infrared, and/or other illumination, one or more banded areas of the items of currency 103A-103E that appear under ultraviolet, infrared, and/or other illumination and the number, size, and/or position that correspond to a particular denomination; and so on) to determine a denomination. In various examples, the electronic device 101 may count a number of the items of currency 103A-103E and/or a value using the number of the items of currency 103A-103E and one or more determined denominations associated with various of the items of currency 103A-103E. Various configurations are possible and contemplated without departing from the scope of the present disclosure.

By way of illustration, the electronic device 101 may determine that the items of currency 103A-103E include two $10 United States banknotes and three $50 United States banknotes. As such, the electronic device 101 may determine that there are 5 items of currency 103A-103E with a total value of $170 in United States dollars.

Further, as part of processing one or more different images to identify and/or otherwise evaluate the items of currency 103A-103E, the electronic device 101 may determine whether or not one or more of the items of currency 103A-103E are valid or might be counterfeit and/or otherwise suspect. For example, the electronic device 101 may determine that the one or more of the items of currency 103A-103E might be counterfeit and/or otherwise suspect using a detection that one or more security features that should be present in the items of currency 103A-103E are not present. By way of another example, the electronic device 101 may determine that the one or more of the items of currency 103A-103E might be counterfeit and/or otherwise suspect by using optical character recognition to determine a serial number on the items of currency 103A-103E and matching that serial number to a suspect currency list. In yet another example, the electronic device 101 may determine that the one or more of the items of currency 103A-103E might be counterfeit and/or otherwise suspect using detected features of the items of currency 103A-103E that do not correspond to what should be present (such as the picture of someone other than Benjamin Franklin on a United States $100 banknote, size of text is incorrect, graphical elements are positioned incorrectly, one or colors are incorrect, and so on). Various configurations are possible and contemplated without departing from the scope of the present disclosure.

Although the system 100 is illustrated and described above as including particular components configured in a particular arrangement, it is understood that this is an example and other configurations of the same, similar, and/or different components may be used. For example, in some implementations, the image sensor 102 may be located under a shelf of the table 107 obscured from view but positioned within approximately a foot of the area 108. Various configurations are possible and contemplated without departing from the scope of the present disclosure.

Figure 2:
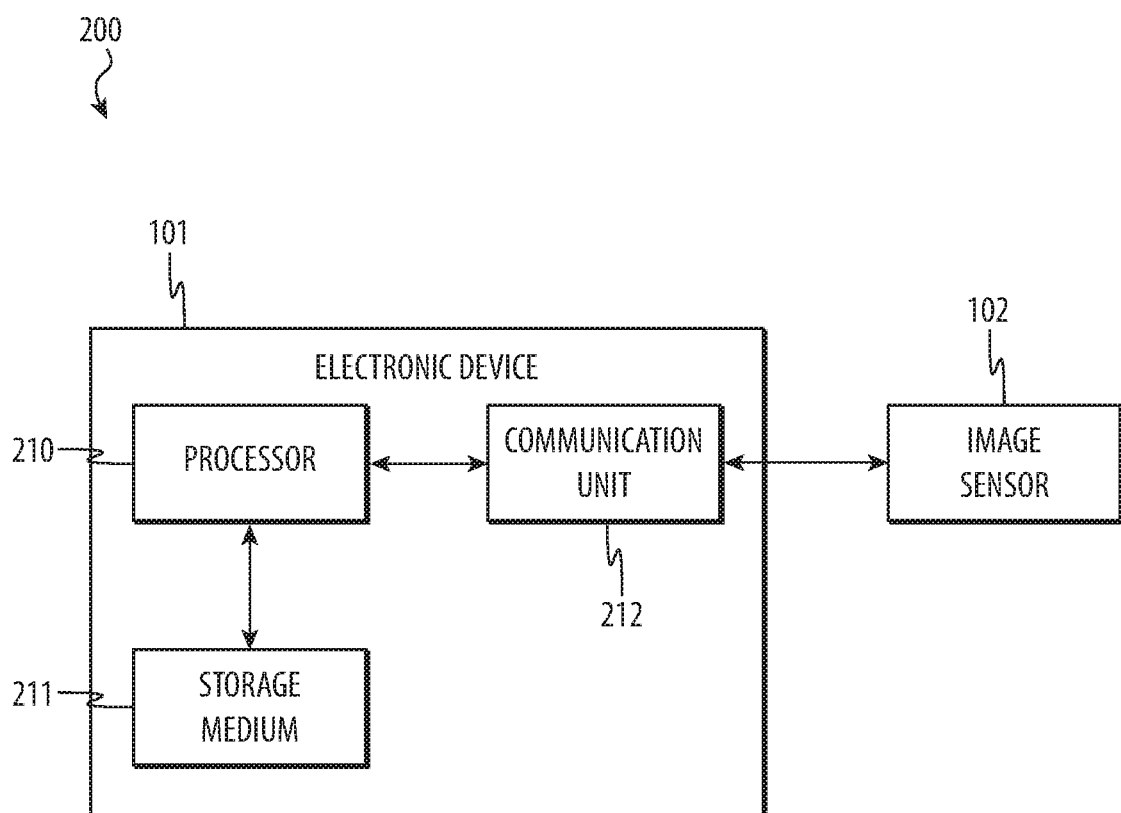
FIG. 2 depicts example functional relationships between example components that may be used to implement the example system of FIG. 1.

FIG. 2 depicts example functional relationships between example components that may be used to implement the example system 100 of FIG. 1. The electronic device 101 may be any kind of electronic device. Examples include, but are not limited to, one or more desktop computing devices, laptop computing devices, mobile computing devices, wearable devices, smart phones, tablet computing devices, and so on. The electronic device 101 may include one or more processors 210, one or more communication units 212, one or more non-transitory storage media 211 (which may take the form of, but is not limited to, a magnetic storage medium; optical storage medium; magneto-optical storage medium; read only memory; random access memory; erasable programmable memory; flash memory; and so on), and/or one or more other components.

The processor 210 may execute one or more instructions stored in the storage medium 211 to perform various functions. Such functions may include, but are not limited to, receiving one or more images from a camera or other image sensor 102 (though in some implementations the image sensor 102 may instead be incorporated into the electronic device 101), processing one or more images, identifying and/or evaluating one or more items of currency in one or more images, counting currency, identifying a denomination of an item of currency in one or more images, determining validity of one or more items of currency, detecting one or more security features of one or more items of currency, transmitting one or more messages to one or more other electronic devices, and so on.

Figure 3:
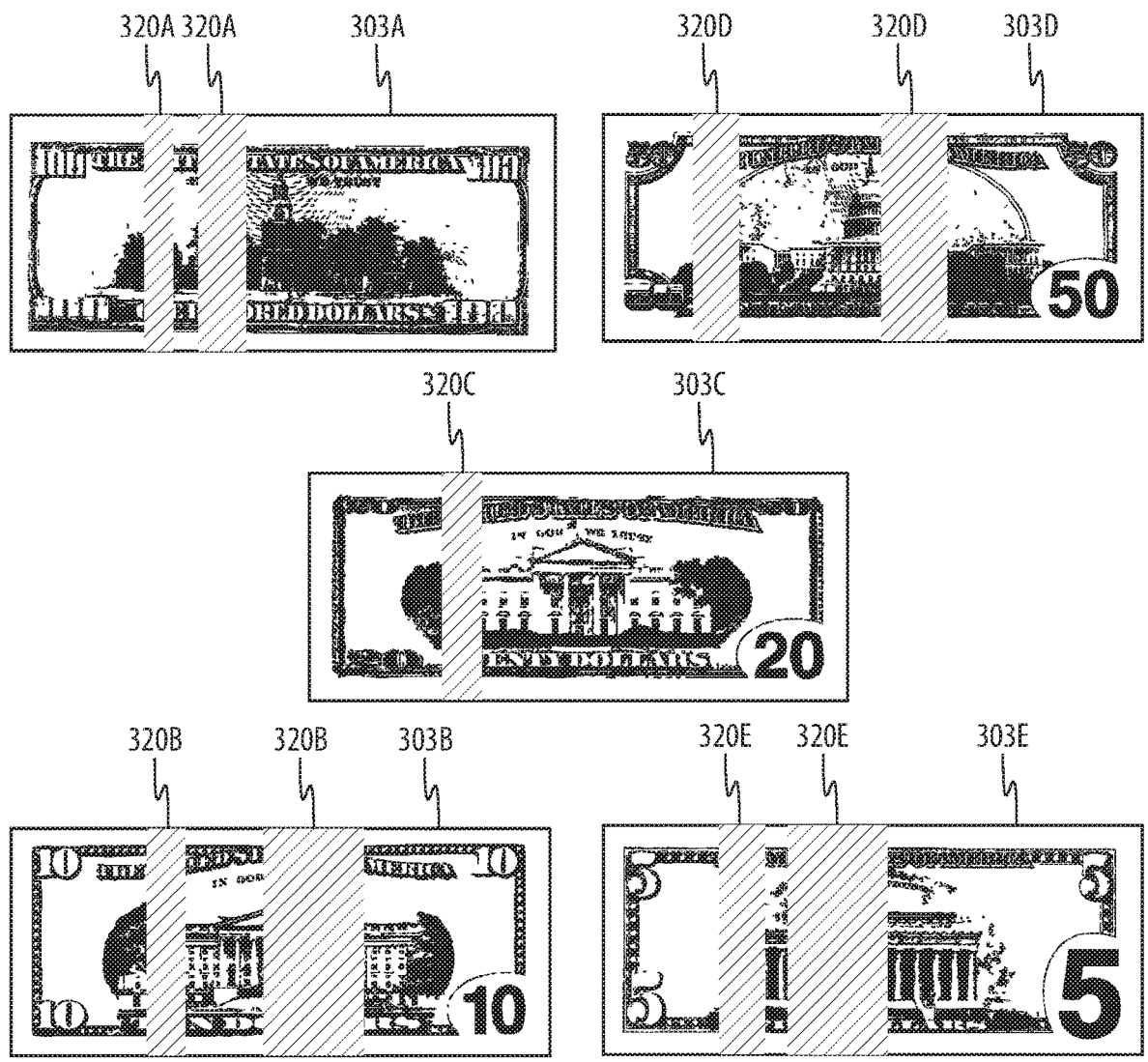
FIG. 3 depicts a first example image illustrating first example security features of items of currency.

FIG. 3 depicts a first example image illustrating first example security features 320A-320E of items of currency 303A-303E. In this example, the security features 320A-320E include one or more strips or bands that are detectable when the items of currency 303A-303E are illuminated with infrared light and/or when the image is captured using an infrared filter. As shown the size, position, and number of the strips may be configured differently for each denomination of the items of currency 303A-303E. Thus, the strips may be used to identify the denomination of the items of currency 303A-303E.

Figure 4:
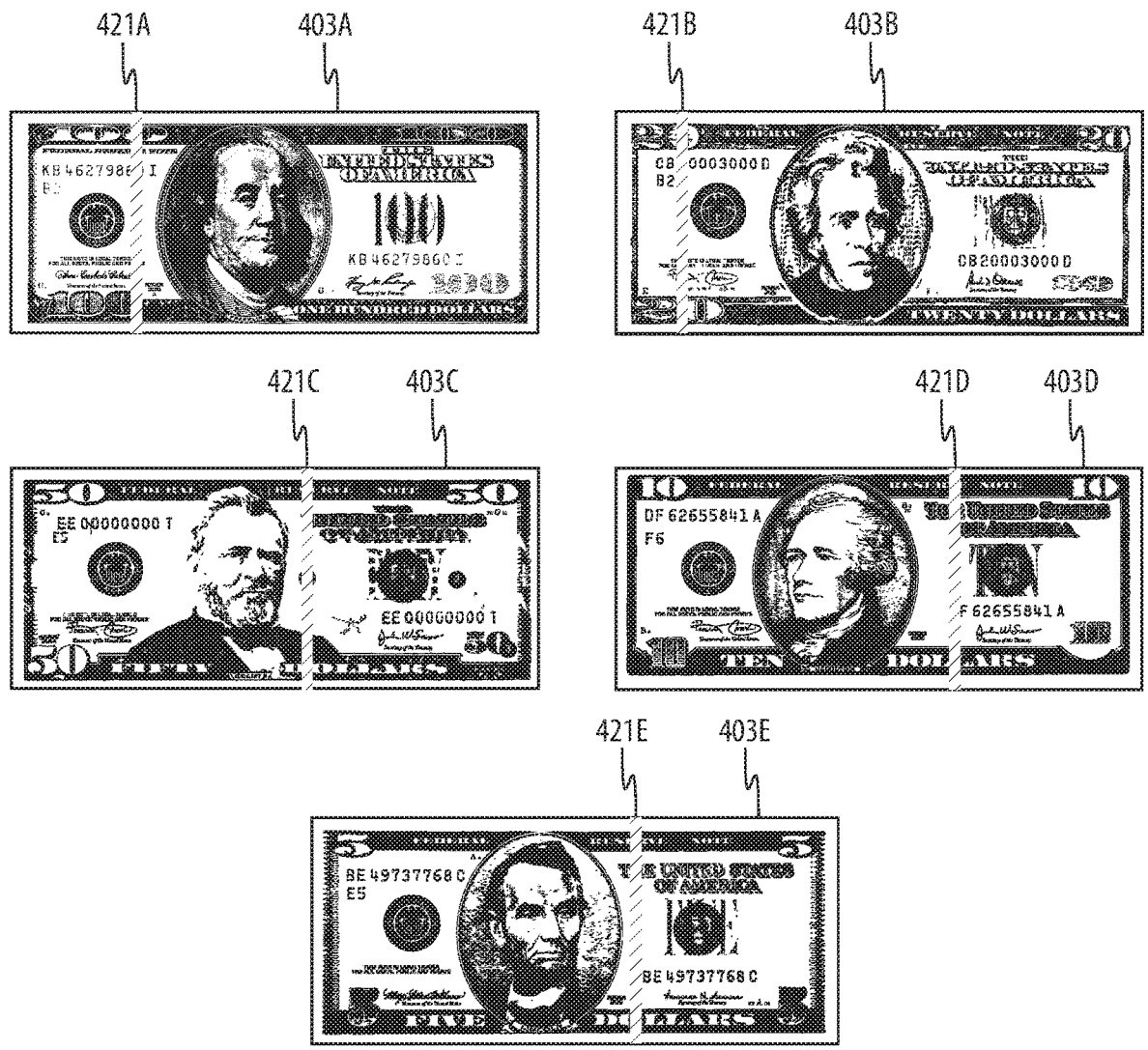
FIG. 4 depicts a second example image illustrating second example security features of items of currency.

FIG. 4 depicts a second example image illustrating second example security features 421A-421E of items of currency 403A-403E. In this example, the security features 421A-421E include one or more security strips that glow a particular color when the items of currency 403A-403E are illuminated with ultraviolet light and/or when the image is captured using an ultraviolet filter. As shown, the position of the security strip and/or glow color may be configured differently for each denomination of the items of currency 403A-403E (such as red for security feature 421A, green for security feature 421B, yellow for security feature 421C, orange for security feature 421D, and blue for security feature 421E). Thus, the security strips may be used to identify the denomination of the items of currency 403A-403E.

Figure 5:
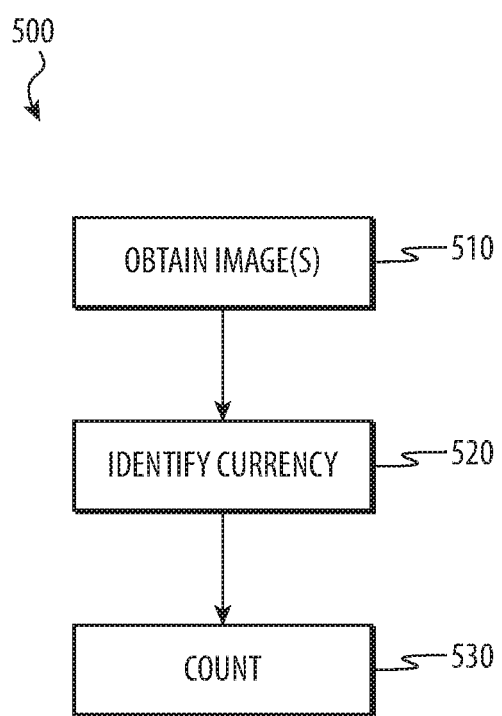
FIG. 5 depicts a flow chart illustrating a first example method for evaluating currency in areas using image processing. This method may be performed by the system of FIG. 1.

FIG. 5 depicts a flow chart illustrating a first example method 500 for evaluating currency in areas using image processing. This method 500 may be performed by the system 100 of FIG. 1.

At 510, an electronic device (such as the electronic device 101 of FIG. 1) may obtain one or more images. For example, the electronic device may receive video from a video camera, a series of still images from a still image camera, a still image from a still image camera and an infrared image from an infrared image sensor, a still image from an image sensor, a still image from a first camera and an infrared filtered image from a camera with an infrared image filter, and so on.

At 520, the electronic device may process the one or more images to identify one or more items of currency in the one or more images. The image processing may include comparing multiple images, performing optical character recognition, recognizing one or more shapes or patterns in the image, calibrating image processing with a previous image that includes no items of currency, detection of one or more security features and/or other features of the items of currency, and so on.

At 530, the electronic device may count the items of currency. For example, the electronic device may count a number of the items of currency, a number of a particular denomination of the items of currency, a value of the items of currency (which may use the number of the items of currency and values associated with determined denominations of the items of currency), and so on.

In various examples, this example method 500 may be implemented as a group of interrelated software modules or components that perform various functions discussed herein. These software modules or components may be executed within a cloud network and/or by one or more electronic devices, such as the electronic device 101 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, in some implementations, the method 500 may include the additional operation of transmitting a notification regarding the count to another electronic device, performing an action if the count is above a threshold (such as $10,000 in United States dollars), and so on. Various configurations are possible and contemplated without departing from the scope of the present disclosure.

In various implementations, a system for evaluating currency in areas using image processing may include a non-transitory storage medium that stores instructions and a processor. The processor may execute the instructions to receive an image of an area from an image sensor, process the image to identify at least one item of currency in the area, determine a value of the at least one item of currency irrespective of validity, and count the at least one item of currency.

In some examples, the processor may process the image by detecting a security feature of the at least one item of currency. In various such examples, the security feature may be an infrared strip.

In a number of examples, the processor may process the image by screening out at least one element common to the image and a previous image. In various examples, the processor may count the at least one item of currency by determining a denomination of the at least one item of currency.

In some examples, the processor may transmit the count to an electronic device. In a number of such examples, the processor may perform an action using a response received from the electronic device.

Figure 6:
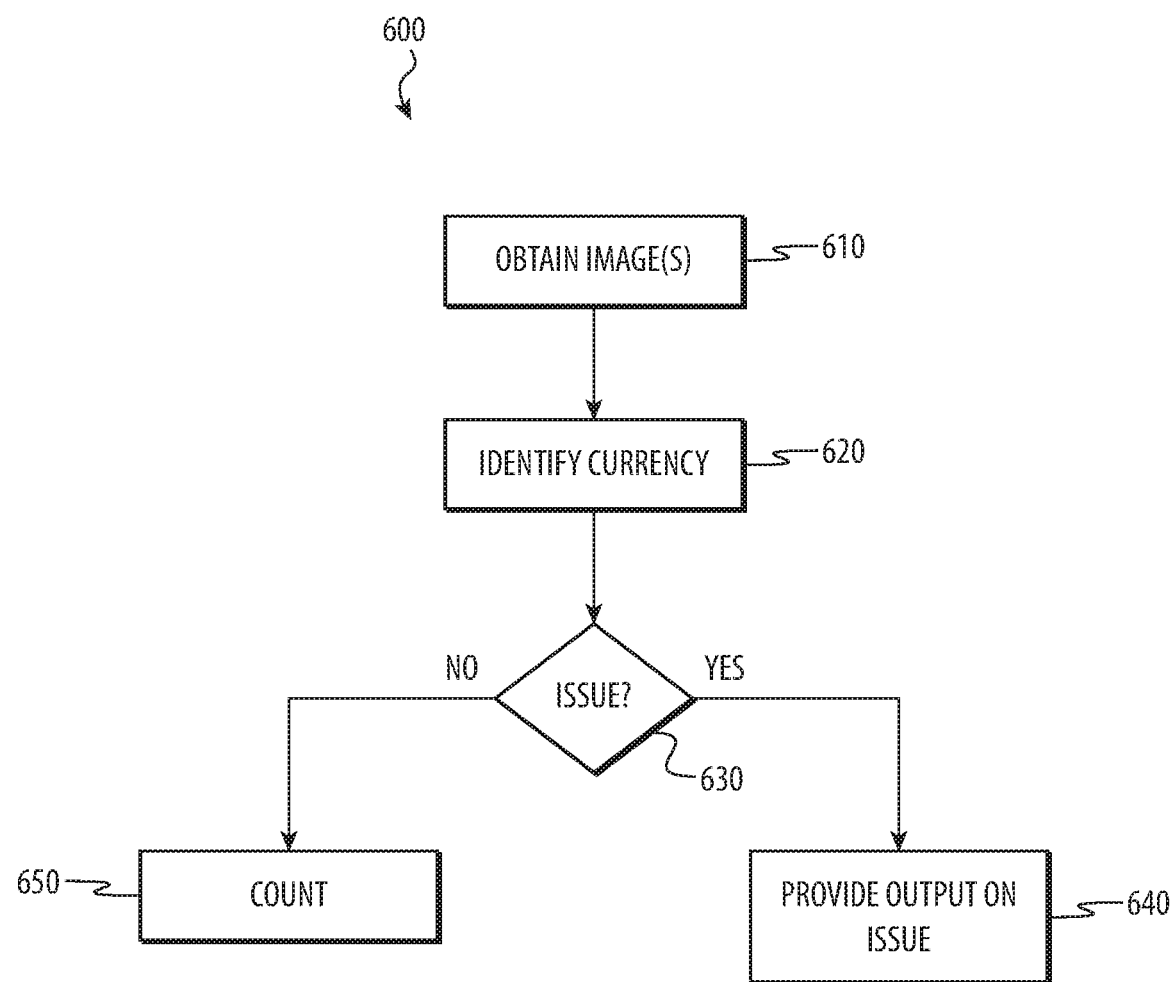
FIG. 6 depicts a flow chart illustrating a second example method for evaluating currency in areas using image processing. This method may be performed by the system of FIG. 1.

FIG. 6 depicts a flow chart illustrating a second example method 600 for evaluating currency in areas using image processing. This method 600 may be performed by the system 100 of FIG. 1.

At 610, an electronic device (such as the electronic device 101 of FIG. 1) may obtain one or more images. At 620, the electronic device may process the one or more images to identify one or more items of currency in the one or more images.

At 630, the electronic device may determine whether or not there is an error condition. For example, one or more of the items of currency may have been obstructed by an object (such as another of the items of currency) such that identification could not be performed. By way of another example, one or more of the items of currency may have been incorrectly oriented (such as placed so that a face side of the item of currency was up when identifying features are on the opposite side) such that identification could not be performed. If so, the flow may proceed to 640. Otherwise, the flow may proceed to 650 where the electronic device may count the items of currency.

At 640, after the electronic device determines that there is an error condition, the electronic device may provide output on the error condition. For example, if one or more of the items of currency was obstructed, the electronic device may provide a direction to remove the obstruction, an indication of where the obstruction is located, and so on. By way of another example, if one or more of the items of currency was incorrectly oriented, the electronic device may provide a direction to reorient the item of currency, an indication as to the item of currency that is incorrectly oriented, and so on. Various configurations are possible and contemplated without departing from the scope of the present disclosure.

In various examples, this example method 600 may be implemented as a group of interrelated software modules or components that perform various functions discussed herein. These software modules or components may be executed within a cloud network and/or by one or more electronic devices, such as the electronic device 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, 650 is illustrated and described as counting the items of currency. However, it is understood that this is an example. In various implementations, the electronic device may perform an action other than counting the currency. In some implementations, 650 may be omitted. Various configurations are possible and contemplated without departing from the scope of the present disclosure.

In some implementations, a system for evaluating currency in areas using image processing may include a non-transitory storage medium that stores instructions and a processor. The processor may execute the instructions to receive an image of an area from an image sensor; process the image to identify at least one item of currency in the area; determine whether the at least one item of currency has an error condition; and when the at least one item of currency is determined to have the error condition, provide output on the error condition.

In various examples, the error condition may be that the at least one item of currency is obscured in the image by an obstruction. In a number of such examples, the output may include a direction to remove the obstruction.

In some examples, the error condition may be that the at least one item of currency is incorrectly oriented for identification. In various such examples, the output may include a direction to reorient the at least one item of currency.

In a number of examples, the image may be at least one of a still image or a video. In various examples, the image sensor may be located at least approximately over one meter from the at least one item of currency.

Figure 7:
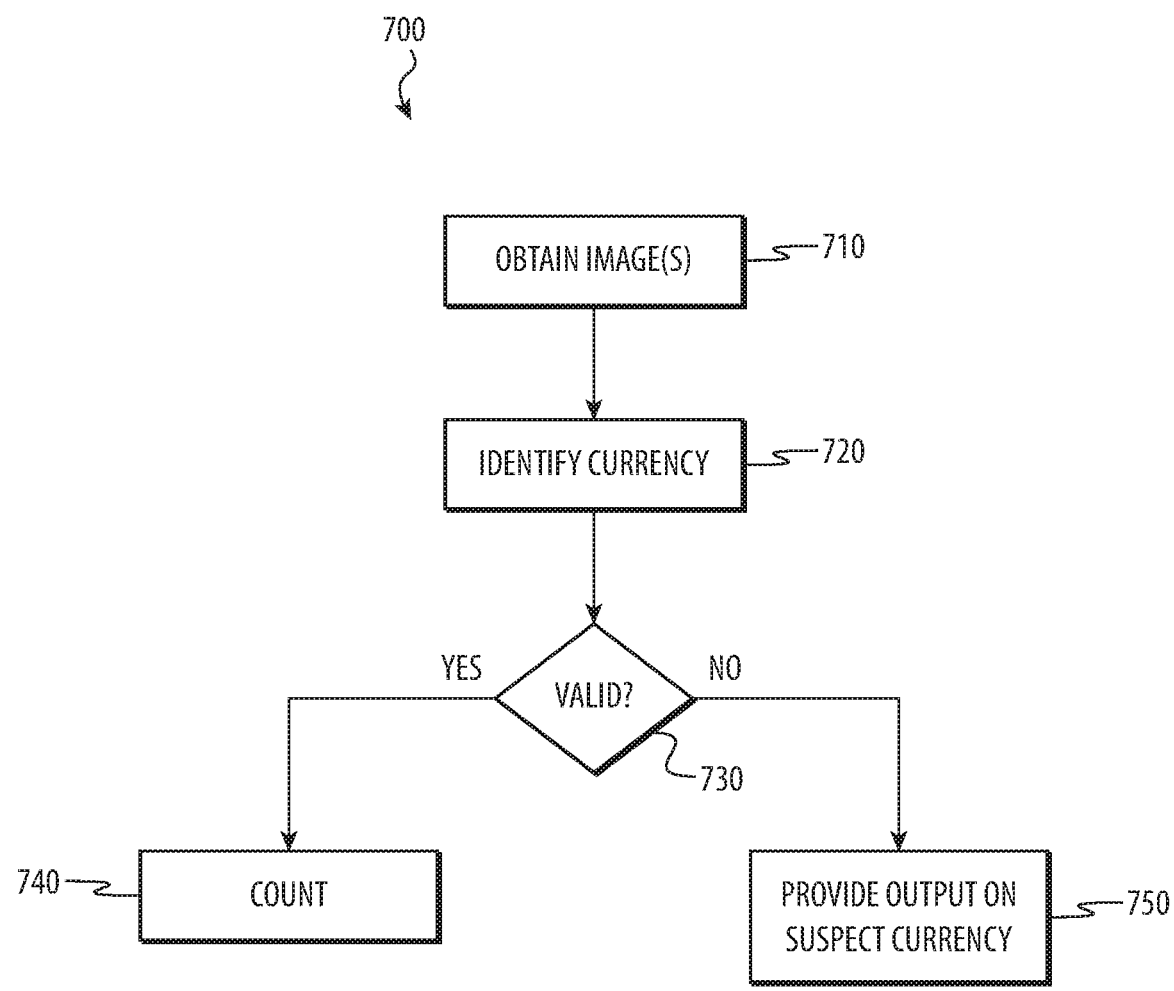
FIG. 7 depicts a flow chart illustrating a third example method for evaluating currency in areas using image processing. This method may be performed by the system of FIG. 1.

FIG. 7 depicts a flow chart illustrating a third example method 700 for evaluating currency in areas using image processing. This method 700 may be performed by the system 100 of FIG. 1.

At 710, an electronic device (such as the electronic device 101 of FIG. 1) may obtain one or more images. At 720, the electronic device may process the one or more images to identify one or more items of currency in the one or more images.

At 730, the electronic device may determine whether or not the items of currency are valid. For example, one or more of the items of currency may not be valid if the electronic device determines that item of currency might be counterfeit (such as where the item of currency is missing a security feature that should be present, if features of the item of currency are not as expected, if a serial number of the item of currency matches a serial number on a suspect currency list, and so on). If so, the flow may proceed to 740 where the electronic device may count the items of currency. Otherwise, the flow may proceed to 750.

At 750, after the electronic device determines that one or more of the items of currency are not valid, the electronic device may provide output on the suspect item of currency. For example, the electronic device may project a light onto the suspect item of currency, summon authorities, identify the suspect item of currency on a display, allow a person who presented the suspect item of currency to retrieve and/or replace the suspect item of currency, and so on. Various configurations are possible and contemplated without departing from the scope of the present disclosure.

In various examples, this example method 700 may be implemented as a group of interrelated software modules or components that perform various functions discussed herein. These software modules or components may be executed within a cloud network and/or by one or more electronic devices, such as the electronic device 101 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, 730 is illustrated and described as involving a determination whether or not an item of currency is valid. However, in various implementations, an item of currency may be suspect for reasons other than possibly being invalid. By way of illustration, an item of currency may be suspect even if valid due to the item of currency being damaged. In such an example, the item of currency might be flagged to allow a determination whether or not to still accept the item of currency despite the damage. By way of another illustration, an item of currency may be suspect even if valid due to a denomination of the item of currency not being determinable. In such an example, the item of currency might be flagged to allow a determination of the denomination. Various configurations are possible and contemplated without departing from the scope of the present disclosure.

In a number of implementations, a system for evaluating currency in areas using image processing may include a non-transitory storage medium that stores instructions and a processor. The processor may execute the instructions to receive an image of an area from an image sensor; process the image to identify at least one item of currency in the area; determine whether the at least one item of currency is valid; and when the at least one item of currency is determined to be suspect, provide output on the at least one item of currency.

In various examples, the processor may determine that the at least one item of currency is suspect when the processor identifies the at least one item of currency as counterfeit. In some such examples, the processor may identify the at least one item of currency as counterfeit when the processor is unable to locate a security feature of the at least one item of currency during processing of the image. In a number of such examples, the processor may identify the at least one item of currency as counterfeit using a numerical identifier extracted from the image using optical character recognition.

In some examples, the image may include a first image from a camera and a second image from an infrared image sensor. In various examples, the image sensor may include an infrared filter.

Although the above describes a number of different embodiments, it is understood that various techniques from these embodiments may be combined in other embodiments without departing from the scope of the present disclosure. Various implementations are possible and contemplated.

As described above and illustrated in the accompanying figures, the present disclosure relates to evaluating currency in areas using image processing. A system evaluates currency in an area using image processing. In some examples, the system receives an image of an area from an image sensor, processes the image to identify at least one item of currency in the area, determine a value of the currency irrespective of validity, and counts the currency. In various examples, the system receives an image of an area from an image sensor; processes the image to identify at least one item of currency in the area; determines whether the currency has an error condition; and when the currency is determined to have the error condition, provides output on the error condition. In a number of examples, the system receives an image of an area from an image sensor; processes the image to identify at least one item of currency in the area; determines whether the currency is valid; and when the currency is determined to be suspect, provides output on the currency.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for evaluating currency in areas using image processing, comprising:
    a non-transitory storage medium that stores instructions; and
    a processor that executes the instructions to:
        receive one or more images of an area from an image sensor positioned at least one meter above said area, said one or more images depicting at least a portion of one or more items of currency, the one or more images captured responsive to a preestablished gesture by a person proximate to the one or more items of currency;
        process the one or more images to identify one or more items of currency in the area;
        determine whether any of the one or more items of currency have an error condition;
        when any of the one or more items of currency is determined to have the error condition, provide an output on the error in substantially real-time and transmit said output on the error condition to an electronic device having a display, said electronic device separate and distinct from said image sensor and positioned proximate to the one or more items of currency such that a person monitoring the electronic device may immediately correct or address the error condition with the one or more items of currency as transmitted to the electronic device; and
        maintain a running count of the total value of currency imaged within said areas by determining denominations of each of said one or more items of currency by evaluating a position of a security strip on each of said one or more items of currency and/or a glow color associated with said security strip on each of said one or more items of currency when subjected to ultraviolet light.

2. The system of claim 1, wherein the error condition is that the at least one item of currency is obscured in the image by an obstruction.

3. The system of claim 2, wherein the output includes a direction to remove the obstruction.

4. The system of claim 1, wherein the error condition is that the at least one item of currency is incorrectly oriented for identification.

5. The system of claim 4, wherein the output includes a direction to reorient the at least one item of currency.

6. The system of claim 1, wherein the image is at least one of a still image or a video.

7. The system of claim 1, wherein the error condition prevents use of the image to count the at least one item of currency.

8. The system of claim 1, wherein the error condition prevents use of the image to determine whether the at least one item of currency is valid.

9. The system of claim 1, further comprising determining from an additional image of the area that the error condition is ameliorated.

10. The system of claim 9, further comprising processing the additional image to count the one or more items of currency.

11. The system of claim 9, further comprising processing the additional image to determine whether the at least one item of currency is valid.

12. The system of claim 1, wherein the error condition is that an identifying feature of the at least one item of currency is on an opposing face of the at least one item of currency.

13. The system of claim 1, wherein the error condition is that the processor was unable to identify the at least one item of currency.

* * * * *